United States Patent [19]

Thibeault

[11] 4,025,144

[45] May 24, 1977

[54] ISOLATED GROUND RECEPTACLE

[75] Inventor: Ronald N. Thibeault, Buena Park, Calif.

[73] Assignee: Sola Basic Industries, Inc., Milwaukee, Wis.

[22] Filed: Mar. 31, 1976

[21] Appl. No.: 672,163

[52] U.S. Cl. .............................. 339/133 R; 174/53
[51] Int. Cl.[2] ......................................... H02G 3/08
[58] Field of Search ....... 339/132 R, 132 B, 133 R, 339/134; 174/53–55

[56] References Cited

UNITED STATES PATENTS

| | | | |
|---|---|---|---|
| 3,713,071 | 1/1973 | Poliak et al. | 339/133 R X |
| 3,967,049 | 6/1976 | Brandt | 174/53 |

*Primary Examiner*—Roy Lake
*Assistant Examiner*—E. F. Desmond

*Attorney, Agent, or Firm*—Blakely, Sokoloff, Taylor & Zafman

[57] ABSTRACT

A strap for mounting an electrical wiring device in a mounting box comprises a yoke member having laterally projecting tabs on each end thereof, the tabs being fastened to the mounting box. A pad of electrically insulating material is positioned upon the tab so as to be interposed between the tab and the mounting box when the strap is mounted. The tab and pad are each provided with a slot through which a mounting screw passes, and the portion of the pad defining the slot has a beveled aperture with resilient lips so as to engage the threads of the mounting screw received in the slot to prevent movement of the mounting screw with respect to the strap and to insulate the strap from the mounting box.

7 Claims, 5 Drawing Figures

U.S. Patent    May 24, 1977    4,025,144
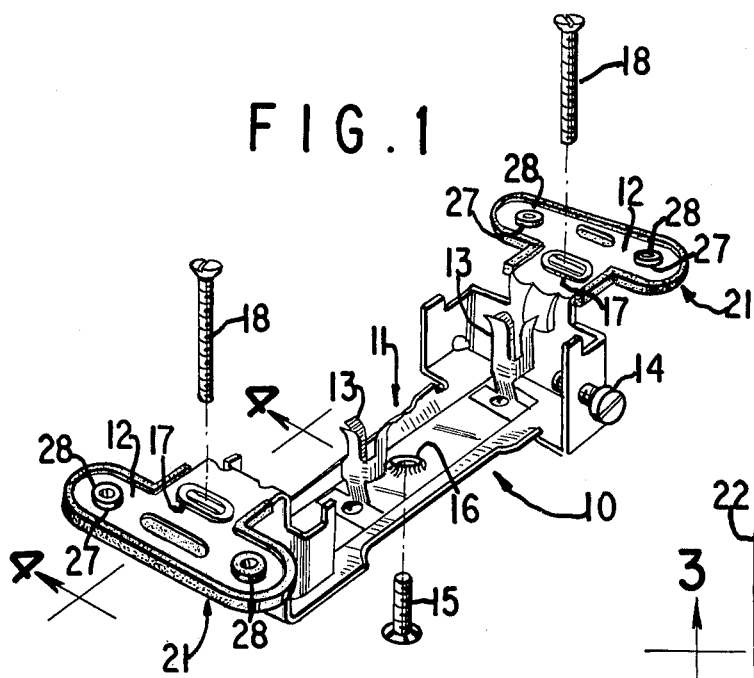
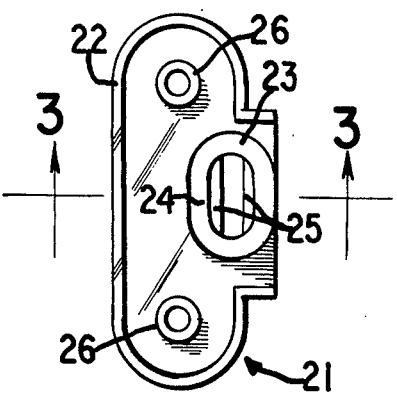
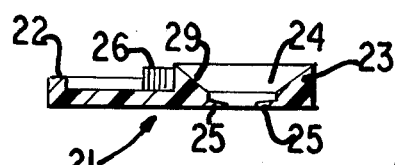
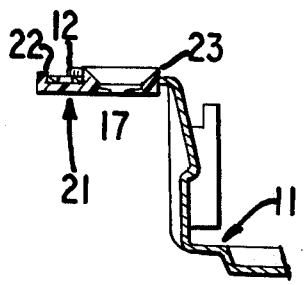
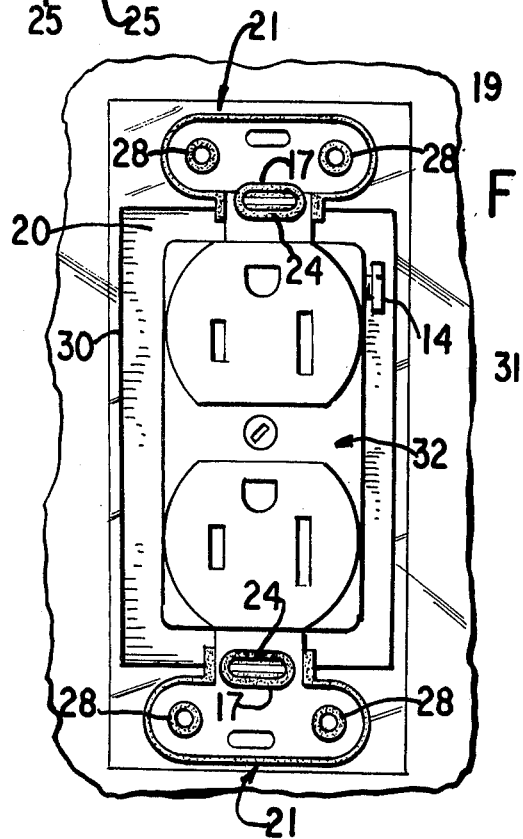

ISOLATED GROUND RECEPTACLE

The present invention relates to the mounting of an electrical wiring device in a mounting box, and more particularly, to a mounting strap for the wiring device so as to insulate electrically the device from the mounting box.

In common practice, electrical devices such as receptacles, switches or other wiring devices are mounted upon a mounting strap which in turn is attached to a mounting box securely fastened in a structure. The mounting box is generally a rigid container positioned such that its outer surface is flush with the wall of the structure upon which the electrical device is mounted. The mounting box functions to protect the electrical device and to prevent contact from any adjacent conductive devices which might bring about a short circuit. The mounting strap is generally a rigid yoke-shaped strap member of metal that may be permanently attached to the electrical device and has laterally projecting tabs on the ends thereof. These tabs are apertured and screws are passed through these apertures to fasten the mounting strap and thus the electrical device to the mounting box. The mounting box may be then grounded to a water pipe or some other suitable grounding member within the structure.

In certain electrical installations and applications, the grounding of the wiring device through the mounting box may bring about undesired interference which may create noise or distortion in sensitive apparatus. In such installations it is generally desirable that the wiring device be mounted so as to be electrically insulated from the mounting box and then be grounded to a suitable ground structure while by-passing the mounting box. This has been somewhat difficult to accomplish satisfactorily and economically when the mounting strap is of metal and the mounting box is also of metal.

A further problem is encountered in preventing the mounting screws from being lost when the electrical device with its mounting strap is not mounted in the mounting box because the screws are loose in the strap and may fall out and be lost.

It is, therefore, an object of the invention to provide an improved means for mounting a wiring device upon a mounting strap which in turn is attached to a mounting box.

It is another object of the present invention to provide an improved electrical wiring device mounting strap capable of retaining the mounting screws.

It is still another object of the present invention to provide a mounting strap for an electrical wiring device which can be mounted directly upon the mounting box and be electrically insulated therefrom.

Other objects, advantages and features of the present invention will become apparent from the accompanying description and drawings, which are merely exemplary.

In the drawings:

FIG. 1 is an overall perspective view of a mounting strap for an electrical device according to the present invention with the mounting screws being shown in exploded relation;

FIG. 2 is a top-plan view of an insulating pad positioned under the mounting tab of the strap shown in FIG. 1;

FIG. 3 is a sectional view taken along the line 3—3 of FIG. 2;

FIG. 4 is a sectional view taken along the line 4—4 of FIG. 1; and

FIG. 5 is a front plan view of a wiring device in the form of a receptacle mounted in the mounting strap of the present invention which is then in turn mounted upon a mounting box.

Proceeding next to the drawings wherein like reference symbols indicate the same parts throughout the various views, a specific embodiment of the present invention is described in detail.

In FIG. 1, there is indicated generally at 10, a mounting strap comprising a yoke member 11 and laterally projecting mounting tabs 12 and 13. In this particular embodiment of the invention, a mounting strap is for a common type of receptacle including a pair of slots and associated female contacts for receiving the line blades of a male plug and a third semi-circular opening associated with a female grounding contact for receiving a rounding prong on the plug. Upstanding from the yoke member 11 are a pair of female grounding contacts 13 of an electrically conducting material, and the mounting strap 10 is of metal. Threaded at one end of the mounting strap is a rounding screw 14. An attaching screw 15 is passed upwardly through an opening 16 in the yoke member for retaining the receptacle or other electrical device therein.

Each mounting tab 12 is provided with a transverse slot 17 which receives mounting screws 18. The mounting screws 18 are threaded into a threaded opening in a flange 19 of a flush-type mounting box 20 in a manner which is known in the art.

A pad of a synthetic plastic material which is electrically insulating is indicated generally at 21 in FIG. 2 and is positioned underneath each mounting tab 12 in the manner as shown. The pad 21 has a shape generally conforming to the outline of the mounting tab and is provided with an upstanding lip 22 which closely fits about the periphery of the mounting tab 12. The pad is provided with an upstanding portion 23 which projects upwardly through the slot 17 of the mounting tab. The portion 23 has a beveled aperture 24 therein which has opposing resilient lips 25 for engaging the threads of the mounting screws 18 to prevent or inhibit movement of the screws with respect to the mounting strap.

The pad 21 may also be provided with a pair of further upstanding portions 26 which project upwardly through openings 27 located adjacent the ends of the respective mounting tabs 12. These projections 26 may be bent over to form flanges 28 which secure the pad to the mounting tab.

In a similar manner, the upper edge of the projection 23 may also be flanged over the adjacent face of the mounting tab to secure the pad to the tab.

The apertures 24 in the pad are elongated so that the electrical device will have a degree of lateral movement ot provide greater versatility in mounting and positioning the device within the mounting box.

The resilient lips 25 of the aperture 24 are sufficiently resilient to enable the screw 18 to be forcibly removed with the threads forcing the resilient lips toward the beveled surfaces 29. The lips 25 will not be permanently deformed during such a removal. It is apparent that when a mounting screw 18 is pushed downwardly through the resilient lips 25, the lips will yield and thus allow a downward movement of the screw 18 with respect to the beveled surfaces 29 which are directed upwardly.

In FIG. 5, the mounting strap 10 is mounted in a mounting box 20 which may be of the type whose outer surface or edge 30 is positioned so as to be substantially flush with a structure surface 31. In a manner known in the art, a plate, which may be of a decorative nature, is then positioned over the device.

The wiring device of FIG. 5 comprises a receptacle 32 of the type as described above. The elongated slots 24 permit a lateral movement of the mounting strap 11 laterally with respect to the mounting box 30 to position precisely the electrical device 32 with respect to the surface 31.

It is apparent that when the mounting strap is attached to the mounting box, the pad 21 of electrically insulating material will be interposed between the mounting tab 12 and flange 19 of the mounting box. Thus, when the mounting screws 18 are passed through the apertures 24 and threaded into the flanges 19 of the mounting box, the mounting strap together with the electrical device will be electrically insulated from the mounting box. An individual grounding connection may then be provided for the electrical device by attachment to the grounding screw 14.

It will be understood that various details of construction and arrangement of parts may be made without departing from the spirit of the invention except as defined in the appended claims.

I claim:

1. A strap for mounting an electrical wiring device in a mounting box comprising a yoke member having mounting tabs on each end thereof for fastening to a mounting box, there being a slot in each tab for receiving a mounting screw therein, a pad of electrically insulating material on a face of said tab to be positioned on a mounting box, said pad having a portion thereon projecting into said slot and defining a beveled aperture having resilient lips to engage threads of a mounting screw received in the slot to prevent free movement of a mounting screw with respect to said strap, the extremity of said pad portion being flanged over the adjacent face of said tab upon which it is positioned to secure said pad to said tab.

2. A strap as claimed in claim 1 wherein said mounting tabs extend laterally in opposite directions from the ends of said yoke member.

3. A strap as claimed in claim 1 wherein each of said slots is transverse to said strap.

4. A strap as claimed in claim 1 wherein said yoke member is of metal and said pad of a synthetic plastic material.

5. A strap as claimed in claim 1 wherein each tab has two apertures at the ends thereof.

6. A strap as claimed in claim 5 wherein said pad has further projecting flanged portions extending into said apertures to additionally secure said pad to said tab.

7. A strap for mounting an electrical wiring device in a mounting box comprising a yoke member having mounting tabs on each end thereof for fastening to a mounting box, there being a slot in each tab for receiving a mounting screw therein, a pad of electrically insulating material on a face of said tab to be positioned on a mounting box, said pad having a portion thereon projecting into said slot and defining a beveled aperture having resilient lips to engage threads of a mounting screw received in the slot to prevent free movement of a mounting screw with respect to the strap, said pad including a upstanding lip on the periphery of said pad for fitting closely around the periphery of said tab.

* * * * *

UNITED STATES PATENT OFFICE
CERTIFICATE OF CORRECTION

Patent No. 4,025,144            Dated May 24, 1977

Inventor(s) Ronald N. Thibeault

It is certified that error appears in the above-identified patent and that said Letters Patent are hereby corrected as shown below:

Column 2, Line 19: change "rounding" to --grounding--;

Column 2, Line 23: change "rounding" to --grounding--;

Column 2, Line 57: change "ot" to --to--.

Signed and Sealed this

Twenty-second Day of November 197

[SEAL]

Attest:

RUTH C. MASON         LUTRELLE F. PARKER
Attesting Officer      Acting Commissioner of Patents and Trademarl